Patented Feb. 15, 1938

2,108,543

UNITED STATES PATENT OFFICE 2,108,543

FERRUGINOUS SILICEOUS REFRACTORIES

John M. McKinley, East Cleveland, and Willard K. Carter, Columbus, Ohio; said Carter assignor to National Aluminate Corporation, Chicago, Ill., a corporation of Delaware, and said McKinley assignor to North American Refractories Company, Cleveland, Ohio, a corporation of Delaware No Drawing. Application July 3, 1935, Serial No. 29,646

10 Claims. (Cl. 106—9)

The present invention relates to improvements in the production of siliceous refractory articles such as fire brick and the like.

One of the primary objects of the invention is to produce siliceous refractories containing iron compounds in the form of barium-iron-silica complexes.

The invention also relates to a process for the production of ferruginous barium-containing siliceous refractories, particularly in so far as it relates to the firing technique employed in their production.

A further object of the invention is to improve the firing properties of siliceous refractories, particularly as to their resistance to high temperature and resistance to spalling, and also to improve their mechanical strength and thermal stability.

A further object of the invention is to produce the effects above outlined by employing barium compounds and iron compounds in conjunction with siliceous matter so as to produce a moldable ceramic mass which on drying and subsequent firing will have distinctive and valuable properties.

A further object of the invention concerns a process for the production of a siliceous refractory ware by incorporating barium campounds with a mass of siliceous particles and a ferruginous substance, shaping the resultant mixture, and drying and firing the same.

Other objects of the invention will appear from the detailed description and claims hereinbelow.

The present invention is a further improvement in the products and processes described in the copending applications of the present applicants, such as in the application entitled "Fired siliceous tribarium aluminate refractory," filed in the United States Patent Office on September 25, 1933, Serial No. 690,882, now matured into Patent No. 2,017,723, granted October 15th, 1935, and the application entitled "Siliceous refractories," filed in the United States Patent Office on June 7, 1934, under Serial No. 729,532, and now matured into Patent No. 2,019,452, granted November 5th, 1935.

Referring to the above mentioned copending applications, the first of these relates to the manufacture of siliceous refractories by the use of barium aluminate, particularly tribarium aluminate, while the second mentioned application deals with the manufacture of siliceous refractories involving the use of barium compounds of such a nature that they are capable of yielding barium oxide at firing temperatures, as for example at about 2750° F. The particular compound used in the second mentioned application is a barium compound of the group consisting of acetate, hydroxide, nitrate, peroxide, and carbonate, while the first mentioned application is limited to the use of barium aluminate.

It has now been found by the inventors that improved and valuable results can be obtained when using barium compounds, such as barium aluminate, a barium compound or salt such as hydroxide, carbonate and the like, when there is also present in the mixture, during the firing stages, either metallic iron or a compound capable of yielding FeO, so that a barium-iron-silicate complex or glass may form. It has been discovered that the presence of the iron greatly enhances the qualities of the ware, particularly by forming a comparatively low-melting barium-ferro-silicate glass which has the property of dissolving silica at high temperatures and then, upon cooling, of redepositing the silica in metamorphic form, the form then assumed by the silica being largely that of tridymite. The tridymite form of silica is much more stable at high temperatures and, having a great volume-stability over a long range of temperature variation, is highly desirable in a siliceous refractory which is to be employed for the lining of furnaces and kilns which are to be subjected to considerable temperature variation and for long periods of time to high temperatures.

One of the most valuable objects attained by the practice of the present invention resides in the great improvement in the fired properties of siliceous refractories, especially as regards the enhancement of their fired strength and resistance to spalling. Thus the present invention constitutes an improvement upon the processes and products described in the previous patents of the present inventors, in that it has now been found that superior results are obtained by employing, in place of the barium aluminate or barium compounds alone, iron salts or compounds in addition to and with the said barium aluminate or barium compounds.

It might be pointed out that the present invention is of great commercial value and that the products have the following important advantages: Many recently developed operations, especially of the electric furnace type, involve temperatures as much as 500° higher than those until recently encountered. The ordinary lime-bonded silica refractory, when exposed to these elevated temperatures, will actually melt and flow very readily from the heat-exposed surface, so that the life of such refractory installations is very short. On the contrary, refractories made according to the present invention exhibit this melting away in considerably less degree than lime-bonded refractories, it having been found that fire brick and the like, containing both iron and barium when made in accordance with the present invention, have the remarkable property of remaining relatively "dry" even at the highest temperatures encountered. In the break-down during service of typical lime-bonded silica brick, wide zones of progressive solution are formed, while silica brick made according to the present invention maintain a very narrow solution zone, with materially slower solution rate.

In commercial installations the following results were obtained: A furnace having an average life of 75 heats with standard lime-bonded refractories underwent 325 heats when using products made in accordance with the present invention. Another furnace, having an average life of 90 heats with standard lime-bonded refractories, stood up as long as 186 heats with products manufactured in accordance with the present invention.

Purely as an exemplification of the present invention and without in any way limiting the same, we may state that our process may be carried out substantially as follows: Siliceous particles form the raw material which constitutes the base upon which the entire refractory structure is founded. In the further description herein as well as in the claims, the term "highly siliceous" is used to describe the commercially available forms of silica (silicon dioxide), such as exemplified by quartz, ganister, and the so-called siliceous fire clays which are described by Alfred B. Searle in his 1917 edition of Ceramics (p. 93) as follows:

"These materials contain 75 to 99 per cent of silica. Some of these materials correspond to silica which contains 10 per cent or more of clay, together with a small amount of impurities. The most important of these are . . . quartz pebbles found in limestone districts . . . ganisters of the lower coal measures . . ."

In its practical commercial form, the raw material used is ganister.

In carrying out the invention, the procedure is about as follows: The ganister is roughly crushed and then charged into a wet pan, wherein it is mixed with sufficient water so that upon grinding it will form a damp, moldable mass. The grinding in a wet pan is continued until the material has acquired the desired degree of comminution, which is best expressed by screen analysis. For example, a screen analysis of a ganister containing about 97% of silica, and which has been ground in the said wet pan to give the following results, may be considered as a satisfactorily ground product:

| Mesh per inch | Per cent. retained | Per cent. through |
|---|---|---|
| 20 | 31.4 | 68.6 |
| 28 | 34.3 | 65.7 |
| 35 | 38.6 | 61.4 |
| 48 | 45.1 | 54.9 |
| 65 | 55.0 | 45.0 |
| 100 | 64.5 | 35.5 |
| 150 | 70.7 | 29.3 |
| 200 | 75.0 | 25.0 |

During the grinding, a suitable quantity of either barium aluminate or some barium compound or salt is added to the material in the wet pan, and in addition thereto a suitable quantity of finely ground iron or some compound of iron is added to the material in the pan, the purpose of this being to secure as thorough a blending of all the ingredients as possible. Ordinarily, about 11½ parts of water, 2 parts of barium aluminate or an equivalent amount of a barium compound expressed as BaO, and an iron compound which is equivalent to from 0.12 to 4.0 parts of $Fe_2O_3$ are employed for each 100 pounds of the ganister. (All figures herein are by weight.)

In order to get the most advantageous results, it is desirable to grind the ganister and water until the desired grain size has almost been obtained and then to add the barium and iron compounds and continue the grinding for a short time. It is not important whether the barium compound is added before or after the iron compound.

After the mixture in the wet pan has acquired the desired degree of comminution, it is removed therefrom and thereupon given the shape of the article it is desired to make, such for instance as fire brick or furnace lining tile. The former may preferably be accomplished by forcing, hammering or pressing the damp mixture into a suitable mold, thus yielding the required wet shapes, which are then removed from the molds and allowed to dry from 24 to 36 hours. It is within the scope of the invention also to employ in the wet pan a small quantity of an organic temporary binder such as "goulac" (cellulose sulfite waste liquor concentrate), or dextrin, starches, and the like. A small amount of carbon black or other form of carbon may also be used, the purpose of this being hereinafter explained more fully. The addition of these temporary binders and/or carbon is, however, not essential.

After drying, the thus formed green articles are placed in a kiln and fired, the firing temperature being carried to as high as about cone 20, which corresponds substantially to 1520° C. or lower. The shaping and firing steps are in most respects those already established in the art of making siliceous refractory ware. However, in order to enhance the formation of the barium-ferro-silicate complexes, it is very advantageous to have a reducing atmosphere in the kiln during the early firing stages, as iron in the ferrous form is much more prone to form the barium iron silica glass which it is desired to produce. This glass has a high solvent power for silica, particularly in the form of quartz, taking up a fairly large quantity thereof. When subsequently the atmosphere in the kiln is regulated so as to be of an oxidizing nature, the iron in the glass will become oxidized to the ferric condition, with the result that its solvent power for quartz diminishes, whereupon the quartz previously held in solution separates out in metamorphic form, particularly in the form known as tridymite.

It is also advisable to control the cooling rate of the material so as to obtain as large a deposition of tridymite as possible. Rapid cooling will tend to minimize the effect of the regulation of the kiln atmosphere, while slow cooling will augment the effect of the atmosphere.

The advantages of the present invention are apparent in the fired ware as follows:

(a) When it is removed from the kiln it is noted that the ware evidences an unusual degree of mechanical strength, as shown by the fact that the bottom courses in the kiln, which consequently have had to carry a considerable load in the form of the ware piled upon them, are not split or cracked.

(b) The ware has a higher, clearer "ring" than is noticed with ware that is bonded with lime or with barium compounds alone.

(c) Microscopic examination reveals an unusual degree of homogeneity as regards the relation of the bonding matrix to the aggregate.

(d) Microscopic examination also shows an unusual degree of conversion of the silica into large and completely formed tridymite crystals with an accompanying high degree of homogeneity as regards the tridymite dispersion.

(e) Spalling tests show a truly remarkable increase in resistance to thermal change.

In order to evidence the remarkable difference which is to be found between products made by prior art methods and those produced by the present invention, a number of experiments were made where products were produced by various formulas, fired under identical conditions, and then subjected to spalling tests. Thus the following experiments were carried out:

|  | Parts |
|---|---|
| Batch 1—Ganister | 100 |
| Lime | 2 |
| Water | 11.5 | ground to a fineness as indicated by the screen hereinabove mentioned.

The spalling tests of the finished products made in accordance with Batch 1 showed a spalling loss, using the Mellon Institute panel spalling test procedure, of 17%.

Batch 2—Was made in accordance with the method disclosed in applicants' copending application Serial No. 690,882 and was as follows:

|  | Parts |
|---|---|
| Ganister | 100 |
| Tribarium aluminate | 2 |
| Water | 11.5 | ground to the same fineness as in case of Batch 1. The spalling loss of this product was only 7%.

|  | Parts |
|---|---|
| Batch 3—Ganister | 100 |
| Tribarium aluminate | 2 |
| Fe₂O₃ in the form of blast furnace flue dust | 0.15 |
| Water | 11.5 | ground to the same fineness as Batches 1 and 2 and fired under identical conditions. The spalling tests showed a loss of only 3.2%, which is better than twice as good as the products made with the tribarium aluminate alone and more than five times as good as the lime-bonded ganister product.

Another advantage of the conjoint use of barium and iron is evident in batches where much more finely ground aggregate is desirable. The simultaneous use of barium and iron permits the use of such much more finely ground material with even greater relative improvement in thermal shock resistability. To test this point, the following batches were made:

|  | Parts |
|---|---|
| Batch 4—Ganister | 100 |
| Lime | 2 |
| Water | 11.5 | the ganister in this instance being much more finely ground, namely, according to the following table:

| Mesh per inch | Per cent. retained | Per cent. through |
|---|---|---|
| 20 | 0 | 100 |
| 28 | 2.0 | 97.8 |
| 35 | 11.5 | 88.5 |
| 48 | 22.9 | 77.1 |
| 65 | 42.2 | 57.8 |
| 100 | 59.9 | 40.1 |
| 150 | 70.7 | 29.3 |
| 200 | 76.5 | 23.5 |

This batch, on firing and subjected to spalling, completely disintegrated; in other words, it proved to be worthless.

|  | Parts |
|---|---|
| Batch 5—Ganister ground as in Batch 4 | 100 |
| Tribarium aluminate | 2 |
| Water | 11.5 |

The spalling loss in this case was 45.1%.

|  | Parts |
|---|---|
| Batch 6—Ganister ground as in Batches 4 and 5 | 100 |
| Tribarium aluminate | 2 |
| Fe₂O₃ (in the form of flue dust) | 0.52 |

The ware so made exhibited a spalling loss of only 11.3%.

These results clearly indicate the effect of the addition of the iron and are more remarkable when it is considered that they concern mixtures which ordinarily have very slight thermal shock resistance, as evidenced from Batch 4 results.

It has not yet been definitely determined just what reactions take place during the firing, but it has been found that the combination of FeO and BaO and $SiO_2$ allows the formation of a glass at around 1000° C. and that this glass has the molecular formula $BaO.FeO.4SiO_2$. This reveals that the combination of BaO and FeO results in the fluxing of a greater quantity of silica than would the addition of either BaO or FeO alone, since the high silica compound of FeO has a composition of $2FeO.SiO_2$, which melts at about 1150° C., while the high silica compound of barium and silica has a formula of $BaO.2SiO_2$, which melts at about 1400° C. It will be apparent to anyone skilled in the art that during the firing of siliceous articles to a temperature equivalent to cone 20, additional silica will be taken into combination to form a silica supersaturated mixture of the $BaO.FeO.XSiO_2$ formula, and that, also the formation of a glass at such a low temperature would allow it to become readily distributed through the mass of ganister particles, before attaining any great increase in viscosity from silica super-saturation, thus contributing to the greater homogeneity which is observed in the ware made in accordance with the present invention.

The amount of iron which it is necessary to add may vary considerably, and on the basis of FeO it may be as little as ⅛% to up to about 4% of the weight of the ganister or other silica used. The iron need not be added in the form of a compound but may even be in the form of finely ground metallic iron, although such materials as FeO, $Fe_2O_3$, $FeCO_3$, flue dust, or even iron silicates may be employed. It should also be remembered that if the ganister itself should be of a ferruginous type, so that it would be capable of yielding iron to the barium, the use of such natural iron-containing ganister or other equivalent form of quartz is to be construed as within the scope of the present invention.

As a further exemplification of the present invention, the use of pre-formed barium ferrite will be considered. Thus, instead of using iron and barium compounds separately, these elements may be added in the form of barium ferrite, using from about 1% to 5% thereof to the weight of the ganister. Other percentages may be used, but in general 10% of the weight of the ganister would constitute the upper practical limit. The type of ganister used will, to a great extent, govern the quantity of barium ferrite added.

A number of examples showing the use of barium ferrite will now be given.

*Example 1*—
| | Parts |
|---|---|
| Ganister | 100 |
| Hydrated lime | 1.5 |
| Ferrite | 2% |
| Water | 11.5 |

The finished product thus obtained has a specific gravity of 2.322, apparent density of 1.735, and a pyrometric cone equivalent (P. C. E.) of from 31 to 32.

*Example 2*—
| | Parts |
|---|---|
| Ganister | 100 |
| Barium ferrite | 1.25 |
| Water | 11.5 |

The barium ferrite was added to preground ganister and the wet pan run for about four minutes, whereafter the material was hammer-molded, dried and fired, as already indicated hereinabove. The specific gravity of the material was 2.371, the apparent density 1.720, and the pyrometric cone equivalent 32.

It has already been mentioned that the control of firing, as far as oxidizing and reducing conditions are concerned, is a feature of the present invention. Suitable firing conditions may be defined as those which will maintain a reducing atmosphere up to or at a temperature above which glass of gillespite composition is forming and for as long thereafter as may be necessary to produce the desired degree of solution of silica in the gillespite glass. At some later stage in the treatment the atmosphere should be oxidizing in order to precipitate the maximum amount of tridymite, although on cooling the tridymite will be precipitated from the excess silica that has been in solution, regardless of the nature of the atmosphere.

In practice, assurance of reducing conditions may be obtained by maintaining heavy fuel beds, with no secondary air supply. Oxidizing conditions may be obtained by lightening the fuel bed and supplying sufficient secondary air. The mechanics of such control are common knowledge to anyone skilled in this art.

The barium content, for the purpose of the present invention, may be supplied from any of a great number of barium salts, such as oxide, carbonate, hydroxide, chloride, or aluminate.

As still further examples of batches which have been found to yield satisfactory results, there may be recited the following:

*Example 3*—100 parts silica containing iron as an impurity to the extent of about 1.5%, calculated as $Fe_2O_3$, 2 parts of tribarium aluminate.

*Example 4*—100 parts of silica containing 1.5% of iron as an impurity when calculated as $Fe_2O_3$ and 2.13 parts of barium carbonate.

*Example 5*—100 parts by weight of silica containing 1.5% of iron as an impurity, calculated as $Fe_2O_3$, and 3.37 parts of barium hydroxide of the formula $Ba(OH)_2.8H_2O$.

*Example 6*—100 parts by weight of pure silica, 2 parts by weight of tribarium aluminate, and 1.24 parts by weight of ferrous carbonate.

*Example 7*—100 parts by weight of pure silica, 2 parts by weight of tribarium aluminate, and 0.694 part by weight of ferric oxide, $Fe_2O_3$.

*Example 8*—100 parts by weight of pure silica, 2.13 parts by weight of barium carbonate, and 4.694 parts by weight of ferric oxide, $Fe_2O_3$.

As a still further exemplification of the invention, it is also to be construed as within the scope thereof to prepare the barium-iron silicate in advance. For example, a sort of gillespite glass may be made by heating together 368 parts by weight of barium oxide, 69 parts by weight of ferric oxide, and 517 parts by weight of silicon dioxide. This glass may then be pulverized and mixed with silica or ganister particles and the mixture fired to about cone 20 under reducing conditions and then cooled slowly under oxidizing conditions.

In order to insure the presence of the reducing condition, a reducing agent may be incorporated with the green mix, as has already been indicated earlier hereinabove, where the use of lamp black or an organic binder was described. As an example of this type of procedure, we may cite the following:

*Example 9*—100 parts by weight of ganister containing approximately 1.5% of iron as an impurity, calculated as $Fe_2O_3$, 0.03 part of lamp black by weight, and 2 parts of tribarium aluminate by weight. The lamp black is added to the tribarium aluminate during the grinding. Organic binders react in the same manner and may be substituted for the lamp black, although the latter is more effective. The use of combustible sulphides is also indicated, although in most cases they will not be as desirable as either carbon or carbon compounds.

The barium-iron-silica glass complexes may also be used as binders in connection with refractories which are not as highly refractory as silica, provided only that fire clays be used which are fairly siliceous, and the invention is therefore not to be limited exclusively to pure silica ware but is to be construed as encompassing any material which is highly siliceous in the sense described hereinabove, as for example in Alfred B. Searle's 1917 edition of Ceramics.

To sum up the present invention, it may be stated to reside in the combining of siliceous particles by means of a glass of the gillespite type, containing barium, iron and silica, in which compositions there has been a considerable conversion of the quartz type of silica into tridymite.

What it is desired to protect and claim is the following:

1. A fired ceramic product comprising siliceous particles and barium ferrite.

2. A fired ceramic product comprising ganister and barium ferrite.

3. The process of producing siliceous refractories which comprises mixing siliceous particles with a barium compound and an iron compound, forming the resulting mixture into a shaped article, and firing the latter in a reducing and then in an oxidizing atmosphere, whereby the particles are to a considerable extent converted into tridymite and are bonded together.

4. The process of producing siliceous refractories which comprises mixing siliceous particles with a barium compound and metallic iron, forming the resulting mixture into a shaped article, and firing the latter in a reducing and then in an oxidizing atmosphere, whereby the particles are to a considerable extent converted into tridymite and are bonded together.

5. The process of producing siliceous refractories which comprises mixing siliceous particles with barium ferrite and a temporary organic binder and water, forming the resulting mixture into a shaped article, and firing the latter in a reducing and then in an oxidizing atmosphere, whereby the particles are to a considerable extent converted into tridymite and are bonded together.

6. The process of producing siliceous refractories which comprises mixing siliceous particles with a barium compound and an iron compound, forming the resulting mixture into shape and firing the same under reducing conditions to form a glassy bond therein containing iron in the ferrous condition, and then continuing the firing under oxidizing conditions whereby tridymite is liberated from the glassy bond.

7. The process of producing a siliceous refractory which comprises heating together to the fusing point barium oxide, ferric oxide and silicon dioxide, cooling and pulverizing the resulting product, mixing the same with silica particles and firing the mixture to about cone 20 under reducing conditions, and then slowly cooling the thus produced body under oxidizing conditions.

8. The process of producing a siliceous refractory which comprises mixing siliceous particles with barium carbonate and iron oxide, forming the resulting mixture into shape and firing the same under reducing conditions to form a glassy bond therein containing iron in the ferrous condition and then continuing the firing under oxidizing conditions, whereby tridymite is liberated from the glassy bond.

9. The process of producing siliceous refractories which comprises mixing siliceous particles with barium ferrite, forming the resulting mixture into shape and firing the same under reducing conditions to form a glassy bond therein containing iron in the ferrous condition and then continuing the firing under oxidizing conditions, whereby tridymite is liberated from the glassy bond.

10. The process of producing siliceous refractories which comprises mixing siliceous particles with tribarium aluminate and ferrous carbonate, forming the resulting mixture into shape and firing the same under reducing conditions to form a glassy bond therein containing iron in the ferrous condition and then continuing the firing under oxidizing conditions, whereby tridymite is liberated from the glassy bond.

JOHN M. McKINLEY.
WILLARD K. CARTER.